(151.)

P. W. RICHARDS.
Improvement in Stuffing Boxes.

No. 121,897.        Patented Dec. 12, 1871.

Witnesses.
John P. McElroy.
Charles J. Burns

Inventor.
P. W. Richards.
p. Brown Bros.
his Attorneys.

AM. PHOTO-LITHOGRAPHIC CO. N.Y. (OSBORNE'S PROCESS.)

UNITED STATES PATENT OFFICE.

PHILLIP W. RICHARDS, OF BOSTON HIGHLANDS, MASSACHUSETTS.

IMPROVEMENT IN STUFFING-BOXES.

Specification forming part of Letters Patent No. 121,897, dated December 12, 1871.

*To all whom it may concern:*

Be it known that I, PHILLIP W. RICHARDS, of Boston Highlands, in the county of Suffolk and State of Massachusetts, have invented certain new and useful Improvements in Stuffing-Boxes; and that the following is a full, clear, and exact description of the same, reference being had to the accompanying drawing.

The present invention relates to stuffing-boxes more particularly for use in connection with the piston-rod for steam-engines, although it is applicable for other engines and purposes. The present invention particularly relates to that class of stuffing-boxes embraced by two separate Letters Patent issued to me bearing date August 8, 1871, and numbers 117,927 and 117,928; and the invention consists of certain improvements in the construction of the sectional rings employed in said patents that are hereinafter more fully described—therefore needing no preliminary statement thereof.

Figure 1:
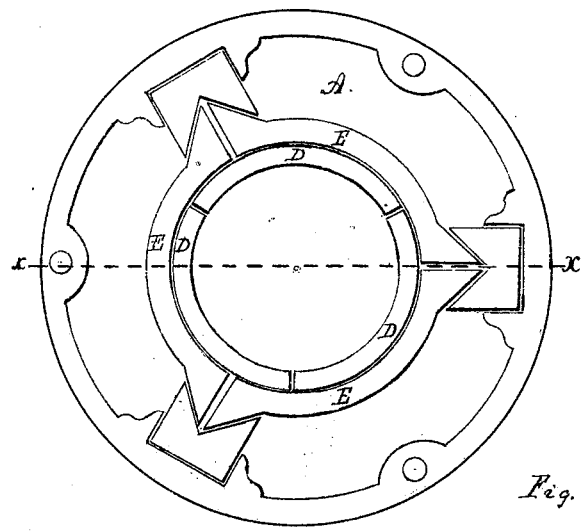
Figure 2:
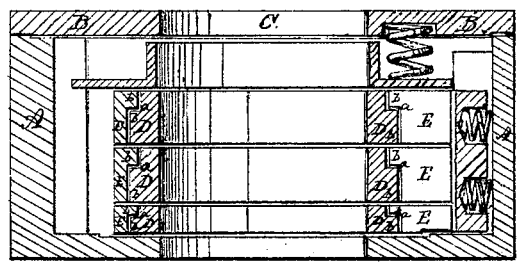
Figure 3:
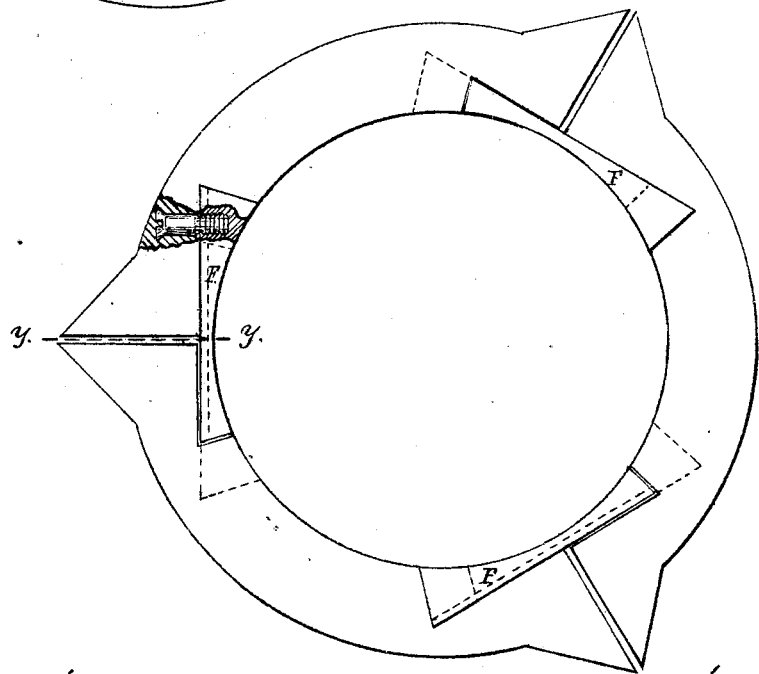

In the accompanying drawing my improvements are illustrated, Figure 1 being a plan view of the interior of the stuffing-box with one of its head-plates removed; Fig. 2, a transverse section in plane of line $x\ x$, Fig. 1; Fig. 3 a plan view of a sectional ring, showing one of my present improved forms of its construction; and Fig. 4 a transverse section in plane of line $y\ y$, Fig. 3.

Figure 4:

A in the drawing, represents the stuffing-box made in the present instance of a cylindrical shape, but it may be of other forms, and provided with a removable head, B, adapted by screws, or otherwise, to be attached to the box A. This box A, exteriorly, may be constructed in any suitable manner for being secured in position for use, and through the center of both head-plates it is provided with a circular opening, C, for the rod to which it is to be applied. D and E are the sectional rings, composed of two series arranged within the box A between its head-plates. The two series D and E are concentric, and each series is composed of three distinct rings with each ring made of three sections, the rings D being the inner, and of an internal diameter equal or thereabout to the external diameter of the rod about which the stuffing-box is to be used, and the rings E the outer. The series of rings D and E is constructed with a joint, shown at $a$, Fig. 2, composed of a square rib, $b$, at one edge, and around the interior periphery of the rings E, and at one edge and around the exterior periphery of the rings D, the two completing the entire width of the rings, so that when the inner rings are placed within the outer rings their periphery will be within that of the outer, and the periphery of the outer within that of the inner, as shown in the figure aforesaid. The advantages of this construction of the rings D and E, above described, consist in its simplicity, ease of manufacture and of fitting, the object of the square joint being to prevent the steam from leaking through the rings. The construction and arrangement of the several sections of the rings D and E, other than that above described, may be similar to that described in either of the Letters Patent above referred to. In Figs. 3 and 4 a construction of the sectional rings is shown, whereby, in lieu of using two sets of sectional rings, the one within the other, one sectional ring ring can be made to suffice. This construction consists of the attachment to or formation on one end of each section to the ring of an arm, F, projecting beyond the line of split with the end of the next section of the ring suitably cut away to wholly receive said arm F, as plainly shown in Fig. 3, completing the continuous inner periphery of the ring. These arms F it is best to make thinner at their lower than at their upper edge so as to produce, when a series of such rings is placed one above another in a stuffing-box, a breakage of their joints one with another, as shown in Fig. 4, and thus to more perfectly prevent the passage of steam through them.

A sectional ring, constructed substantially as just above described and shown in Fig. 3, has been found to successfully accomplish the purpose of a double series, inner and outer, of sectional rings, the projecting arms F serving the purpose of the inner rings in the patents hereinbefore referred to. It may be well to here observe that sectional rings, such as shown in Figs. 3 and 4, in addition to the construction shown and described, are to be constructed and arranged with springs to hold them against the rod, substantially as shown in the aforesaid Letters Patent. The arms F, in lieu of being made of an uneven thickness, as described, may be even in thickness through their whole width; but it is preferable to make them as specified, as a breakage of joints is thus obtained. In lieu of arranging the arm F wholly on one section it may be part on one section and part on the next adjoining with the contiguous section, both suitably constructed, the one to receive the prong or arm of the other.

Having thus described my invention, what I claim, and desire to secure by Letters Patent, is—

1. The sectional rings D and E having square joint a, substantially as shown and described.

2. A sectional ring constructed so as for the one section to pass by the line of its split with the next section, and to lie within the same, substantially as described, for the purpose specified.

The above specification of my improvements in stuffing-boxes signed by me this 6th day of October, A. D. 1871.

PHILLIP W. RICHARDS.

Witnesses:
EDWIN W. BROWN,
ALBERT W. BROWN.

(151)